United States Patent
Dean et al.

[11] Patent Number: 6,011,383
[45] Date of Patent: Jan. 4, 2000

[54] LOW POWERING APPARATUS FOR AUTOMATIC REDUCTION OF POWER IN ACTIVE AND STANDBY MODES

[75] Inventors: Alvar A. Dean; Kenneth J. Goodnow, both of Essex Junction; Patrick E. Perry, Shelburne; Wilbur D. Pricer, Charlotte; William R. Tonti, Essex Junction, all of Vt.

[73] Assignee: International Business Machines Corporation, Armonk, N.Y.

[21] Appl. No.: 09/120,211

[22] Filed: Jul. 21, 1998

[51] Int. Cl.$^7$ .............................. G05F 1/110; G06F 1/00
[52] U.S. Cl. ............................ 323/234; 364/707
[58] Field of Search .................... 323/234, 273; 364/701; 365/226, 227, 229; 395/750

[56] References Cited

U.S. PATENT DOCUMENTS

| | | | |
|---|---|---|---|
| 5,167,024 | 11/1992 | Smith et al. | 395/375 |
| 5,337,285 | 8/1994 | Ware et al. | 365/227 |
| 5,432,944 | 7/1995 | Nuckolls et al. | 395/750 |
| 5,469,553 | 11/1995 | Patrick | 395/750 |
| 5,475,847 | 12/1995 | Ikeda | 395/750 |
| 5,532,945 | 7/1996 | Robinson | 364/707 |
| 5,542,035 | 7/1996 | Kikinis et al. | 395/750 |
| 5,602,784 | 2/1997 | Kojima et al. | 365/189.09 |
| 5,617,572 | 4/1997 | Pearce et al. | 395/750 |
| 5,657,257 | 8/1997 | Lee | 364/707 |
| 5,754,037 | 5/1998 | Ezell et al. | 323/273 |

*Primary Examiner*—Adolf Deneke Berhane
*Attorney, Agent, or Firm*—Schmeiser, Olsen & Watts; Eugene I. Shkurko

[57] ABSTRACT

A low powering apparatus for automatic reduction of power in active and standby modes is disclosed. The low powering apparatus includes a state detector, a margins of safety device and a positioning device. The state detector detects a first or second state, such as a standby state and an active state, that has predominated in a recent past. The margins of safety device indicates safe low power margins in correlation to the detected first or second state. The positioning device adjusts the power level according to the outputs of the state detector and margins of safety device. Thus, the low powering apparatus minimizes the power level of a system at the first or second state without compromising full performance of the system.

28 Claims, 7 Drawing Sheets

LOW POWERING APPARATUS FOR AUTOMATIC REDUCTION OF POWER IN ACTIVE AND STANDBY MODES

RELATED APPLICATIONS

This application is related to two co-pending applications: Dkt. No. BU9-97-204, U.S. Ser. No. 09/159,898 filed Sep. 24, 1998 entitled "ASIC LOW POWER ACTIVITY DETECTOR TO CHANGE THRESHOLD VOLTAGE," by Dean et al; and Dkt. No. BU9-97-119, U.S. Ser. No. 09/159, 861 filed Sep. 24, 1998 entitled "DEVICE AND METHOD TO REDUCE POWER CONSUMPTION IN INTEGRATED SEMICONDUCTOR DEVICES USING A LOWER POWER GROGGY MODE," by Dean et al. Both related applications are assigned to the assignee of record, are filed concurrently herewith, and are herein incorporated by reference.

BACKGROUND OF THE INVENTION

1. Technical Field

The invention relates generally to integrated circuits, and more specifically, to automatic power reduction for integrated circuits.

2. Background Art

In many battery-powered systems, such as portable electrical equipment, achieving low-power consumption with minimal battery drain current is important. To achieve low-power consumption, many portable systems have a "sleep mode" or standby mode that generally decreases the clock frequency. Then, when an input stimulus is detected, the clock frequency is brought back up to full-speed for active mode. Similarly, when the system is in active mode, a reduced clock speed may be used for power savings depending on the level of activity of the system or parts of the system. Two examples of this type of power reduction is found in the following U.S. Patents: U.S. Pat. No. 5,617,572, issued in April 1997 to Pearce et al.; and U.S. Pat. No. 5,475,847, issued in December 1995 to Ikeda et al. Pearce describes various I/O devices that are powered down individually through timers. When the allotted time of an I/O device has elapsed and the I/O device has not experienced any activity, the powering level of that I/O device is decremented into a deeper sleep mode. Ikeda teaches a computer system that operates at a full clock speed and at a reduced clock speed for power savings. The activity level of the system will determine the appropriate clock speed.

Although power savings is addressed in the aforementioned patents, the reduction of power is dependant upon the activity level of the system. Other conditions, such as integrated circuit (IC) manufacturing tolerances, aging, temperature, and current usage that may affect the performance level of the system, and thus the power consumption, are not considered. Furthermore, many portable equipment applications require a state of "instant readiness" from which the equipment can immediately respond with full performance to an input stimulus. The conditions for maintaining "instant readiness" and minimal drain current for either active or standby modes are themselves in direct opposition.

SUMMARY OF THE INVENTION

It is thus an advantage of the present invention to provide an apparatus that eliminates the above described defects.

The advantages of the invention are realized by a low powering apparatus having a state detector, a margins of safety device and a positioning device. The state detector detects a first or second state, such as a standby state and an active state, that has predominated in the recent past. The margins of safety device indicates safe low power margins in correlation to the detected first or second state. The positioning device adjusts the power level according to the outputs of the state detector and margins of safety device. Thereby, the low powering apparatus minimizes the power level of a system at the first or second state without compromising full performance of the system.

The foregoing and other advantages and features of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

DETAILED DESCRIPTION OF THE DRAWINGS

Overview

Operational States of Low and High Power

As stated in the background of the invention, the combination of "instant readiness" and low power consumption is important to the performance of certain integrated circuits (IC), such as found in portable battery-powered equipment. In achieving this combination, the present invention recognizes two low power states: a low power active state and a low power standby state. That is, when active cycles predominate in the IC, minimum drain current and power is achieved with the lowest practical voltage supply (Vdd), which is accompanied with a low threshold voltage (Vt) for both N- and P-type transistors of the IC. This allows the IC to reach stated performance goals at the minimum power level possible. When standby cycles predominate, the lowest drain current is achieved with a higher Vt, which reduces subthreshold currents. This higher Vt, however, needs to be accompanied by a matching higher Vdd, which together will allow the IC to maintain its instant readiness to deliver normal performance cycles on demand. Thus, fill performance is achieved for both states at a minimum power level.

Figure 1:
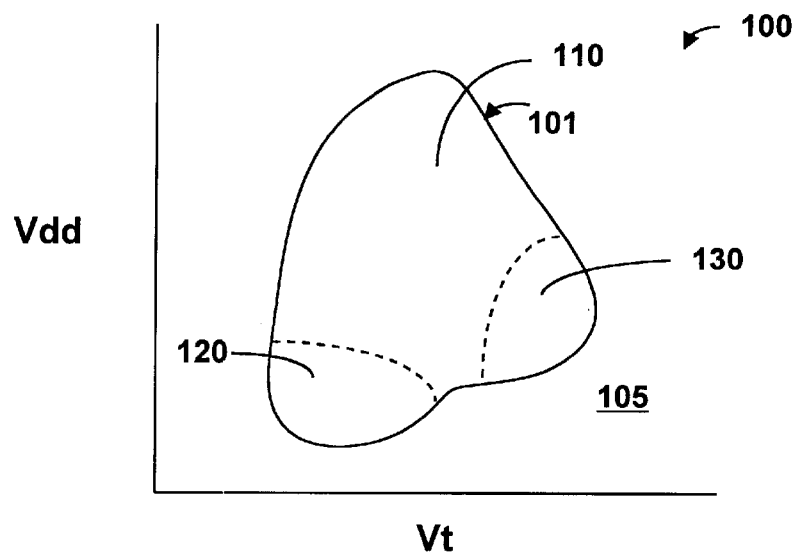
FIG. 1 is a diagram of the operating conditions for a low powering apparatus in accordance with a preferred embodiment of the present invention.

As seen in FIG. 1, the operational high and low power states of an IC circuit are illustrated in a diagram 100 of operational voltages (also referred to as a schmoo). The schmoo boundaries 101 encompass the acceptable voltages for Vdd (y-coordinate) and Vt (x-coordinate) of the circuit and represents the composite region of full high performance. The region 105 outside of the schmoo boundaries 101 represents a fault in the circuit. Within the schmoo boundaries 101, there are three operational regions: a region of high power 110, a region of low active power 120, and a region of low standby power 130. As aforementioned, the region of low active power 120 is the region of the lowest practical Vdd and Vt, and the region of the low standby power 130 is the region of a high Vt and a moderate Vdd. Hence, as will be seen in subsequent examples and embodiments, utilizing the low active power region and low standby power region allow optimization of minimum power for both active and standby states.

Detailed Description

Figure 2:
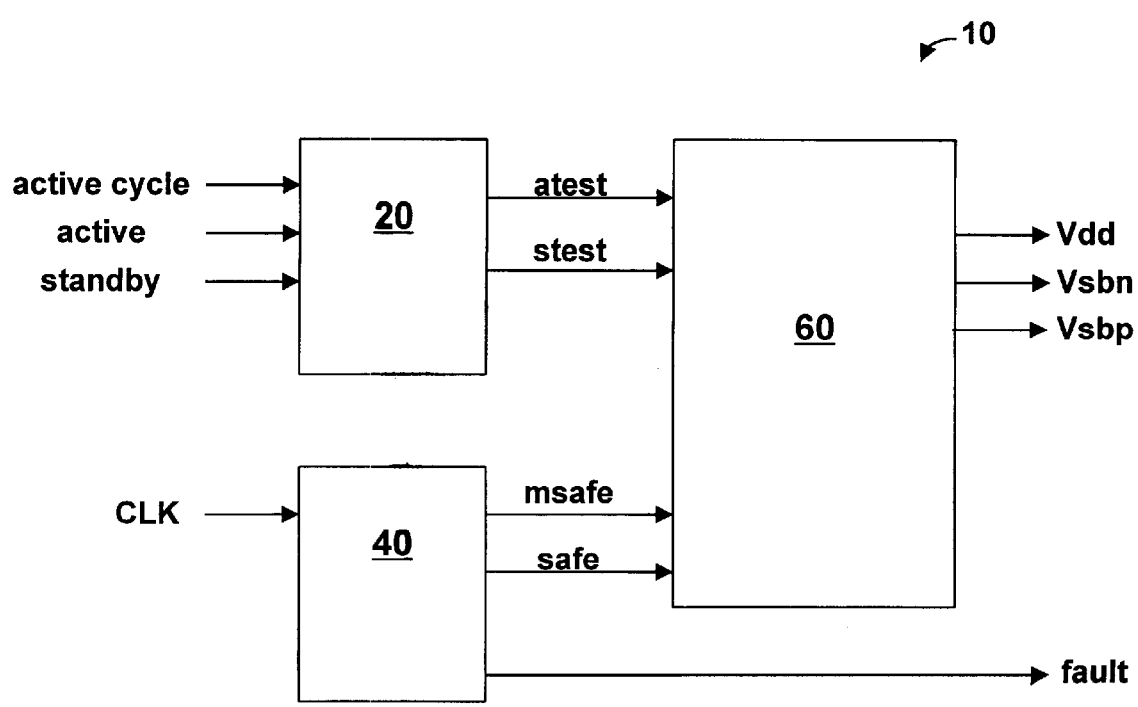
FIG. 2 is a block diagram of a low powering apparatus in accordance with a preferred embodiment of the present invention.

Referring to FIG. 2, a block diagram of a low powering apparatus 10 for an IC circuit, such as a battery-powered portable system in accordance with a preferred embodiment of the present invention is shown. Low powering apparatus comprises state detector 20, margins of safety (MS) device 40, and positioning device 60. State detector 20, receiving active, standby, and active cycle signals, initiates the testing of the current state, detects the state of the IC circuit and outputs an active test limit (atest) signal if the active state has predominated in the recent past, or a standby test limit (stest) signal if the standby state has predominated in the recent past. MS device 40, receiving clock pulse CLK, indicates the current safe low power limits in correlation to the state of the IC circuit. That is, MS device 40 outputs a safe, more-than-safe (msafe), or fault signal corresponding to the current safe low power limit (determined by Vdd and Vt).

Positioning device 60, coupled to state detector 20 and MS device 40, then adjusts Vdd and the voltages of the substrate bias (Vsb, which in turn adjusts the N- and P-channel Vt), according to the outputs of state detector 20 and MS device 40. As will be disclosed in further detail below, the positioning device 60, in combination with the state detector 20 and MS device 40, thus probes the lowest practical powering level which will sustain desired performance under current operating conditions, without exceeding the margins in which proper operation of the equipment can be safely guaranteed. Furthermore, initiating the test to adjust Vdd and Vt occurs frequently enough that the current conditions (e.g., temperature) will not have fluctuated greatly between tests, and infrequently enough so that the tests themselves will not contribute significantly to battery drain.

Figure 3:
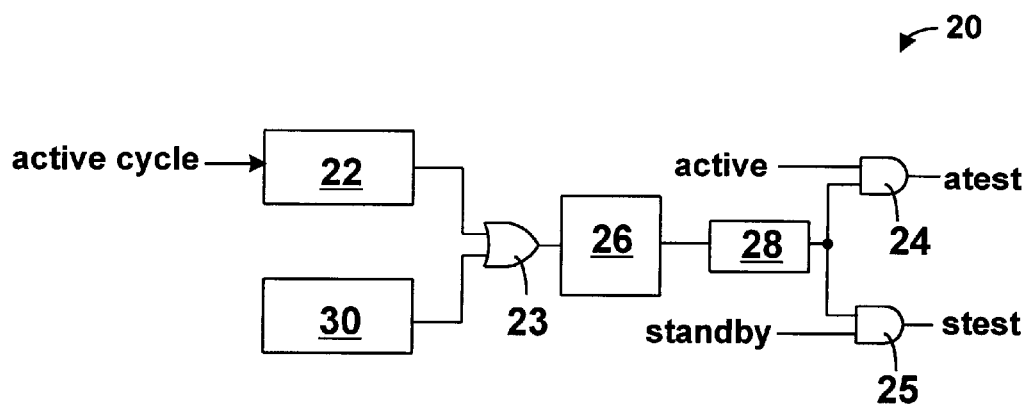
FIG. 3 illustrates a block diagram of a state detector of the low powering apparatus of FIG. 2.

FIG. 3 illustrates an exemplary block diagram of state detector 20 in accordance with a preferred embodiment of the present invention. The active cycle signal is inputting into a cycle counter 22. The output of active cycle counter 22 is inputted into OR 23 along with the output of a low frequency oscillator 30 (with a frequency approximately between 1.0 and 100 Hz). The output of OR gate 23 initiates an interrupt during which the pertinent tests are run. The output of OR 23 is then inputted into an optional clock sync 26, which synchronizes the OR output with a clock input (not shown). The output of clock sync 26 is inputted into two AND gates 24 and 25 via a single shot circuit 28. A standby signal is also inputted into AND gate 24, which outputs the standby test limit (stest) signal. Similarly, an active signal is inputted into AND gate 25, which outputs the active test limit (atest) signal.

Figure 4:
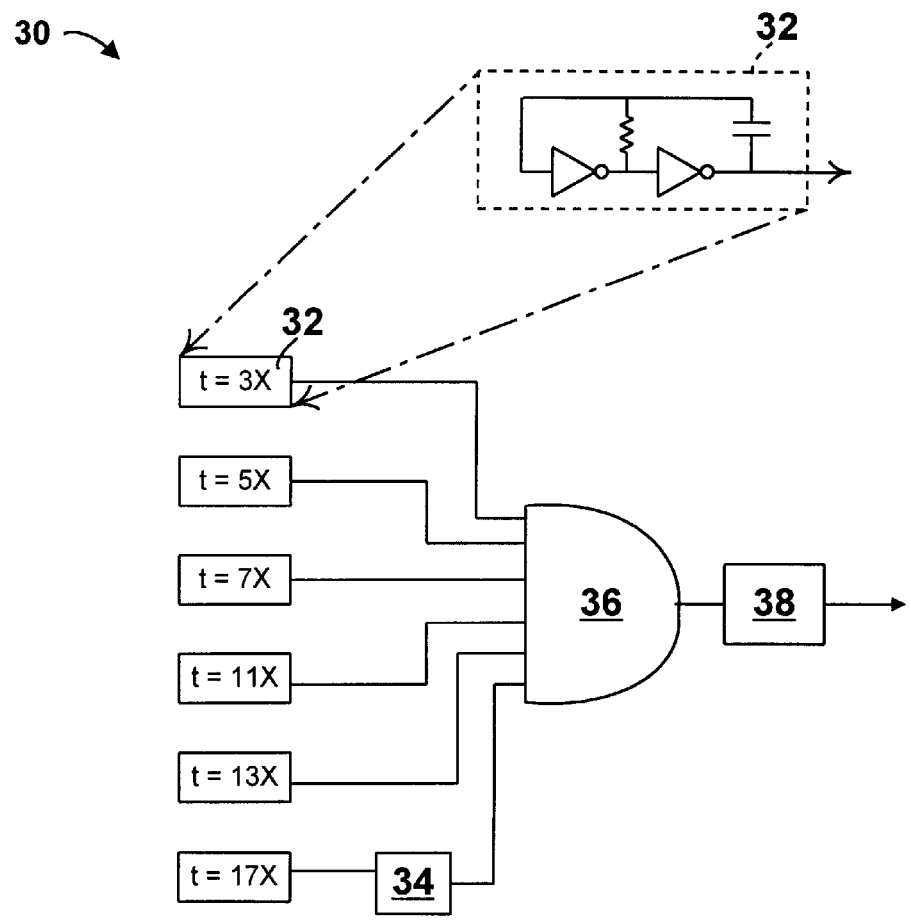
FIG. 4 illustrates a block diagram of an exemplary low frequency oscillator of FIG. 3.

FIG. 4 illustrates an exemplary low frequency oscillator 30 that may be used in state detector 20 (FIG. 3). A decoder, such as an AND gate 36, receives the outputs of a series of sub-oscillators with the oscillator time constants set to prime numbers: 1, 3, 5, 7, 13, and 17. Each sub-oscillator may be any simple oscillator, such as the one shown for element 32. The sub-oscillator comprising the oscillator time constant of t=17 also contains single shot circuit 34. The output of AND gate 36 is then inputted through single shot circuit 38, which in turn outputs a low frequency output with random variations that discourage frequency locking.

Figure 5:
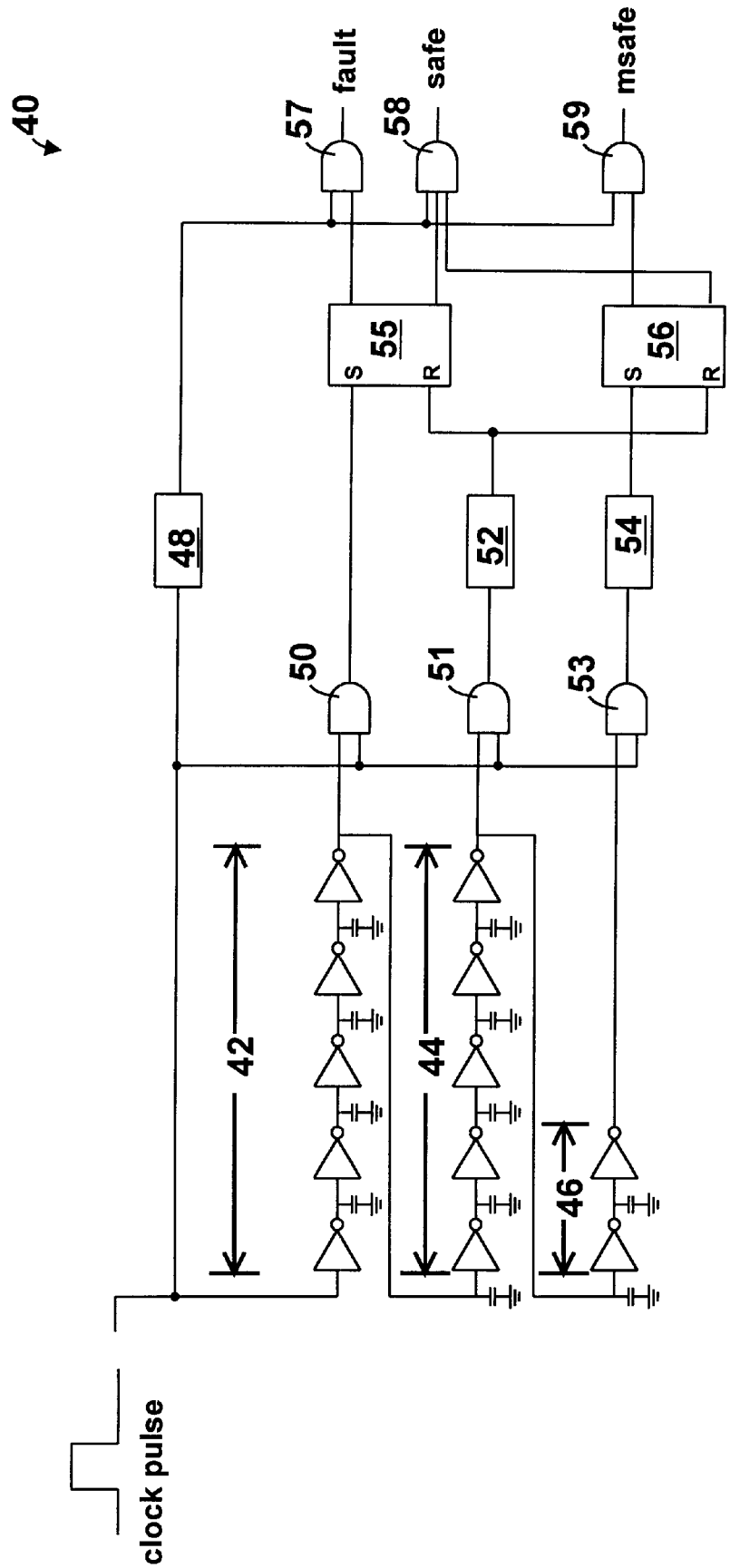
FIG. 5 is a block diagram of a margins of safety device of the low powering apparatus of FIG. 2.

In reference to FIG. 5, a block diagram of an exemplary MS device 40 in accordance with a preferred embodiment of the present invention is shown. MS device 40 comprises inverter chains 42 and 44 that are loaded to simulate the worst case path, additional stages of logic 46, delay circuit 48, AND gates 50, 51 and 53, pulse stretch circuits 52 and 54, set/reset latches 55 and 56 and AND gates 57, 58 and 59. The first inputs of AND gates 50, 51 and 53 are coupled to the clock input. The second inputs of AND gates 50, 51 and 53 are coupled to the first inverter chain 42, the second inverter chain 44, and additional stages of logic 46, respectively. The output of AND gate 51 is coupled to pulse stretch circuit 52, which in turn is coupled to the resets of set/reset latches 55 and 56. The output of AND gate 50 is coupled to the set input of set/reset latch 55. The output of AND gate 53 is coupled to pulse stretch circuit 54, which in turn is coupled to the set input of set/reset latch 56. The first inputs of AND gates 57, 58 and 59 are coupled to the delay circuit 48 output. The second inputs of AND gates 57, 58 and 59 are coupled to the output of set/reset latch 55, the inverted outputs of set/reset latches 55 and 56, and the output of set/reset latch 56, respectively. AND gate 57 outputs a fault signal. AND gate 58 outputs a safe signal, indicating a safe performance power limit for the current operations, and AND gate 59 outputs a more-than-safe (msafe) signal corresponding to a more-than-safe performance power limit for the current operations.

As aforementioned, MS device 40 illustrates a means for probing the current performance limits of the IC without exceeding those limits. A race is established between one cycle of the system clock and inverter chains 42, 44 and 46. Inverter chains 42 and 46 are selected to be slower than the worst case signal path on the regular portions of the IC. The individual inverters may all be identical or they may incorporate higher levels of simulated "realism", which will make their performance closer to the real worst case signal path. The additional logic stages 46 provide the needed margin against unsafe operation.

Figure 6:
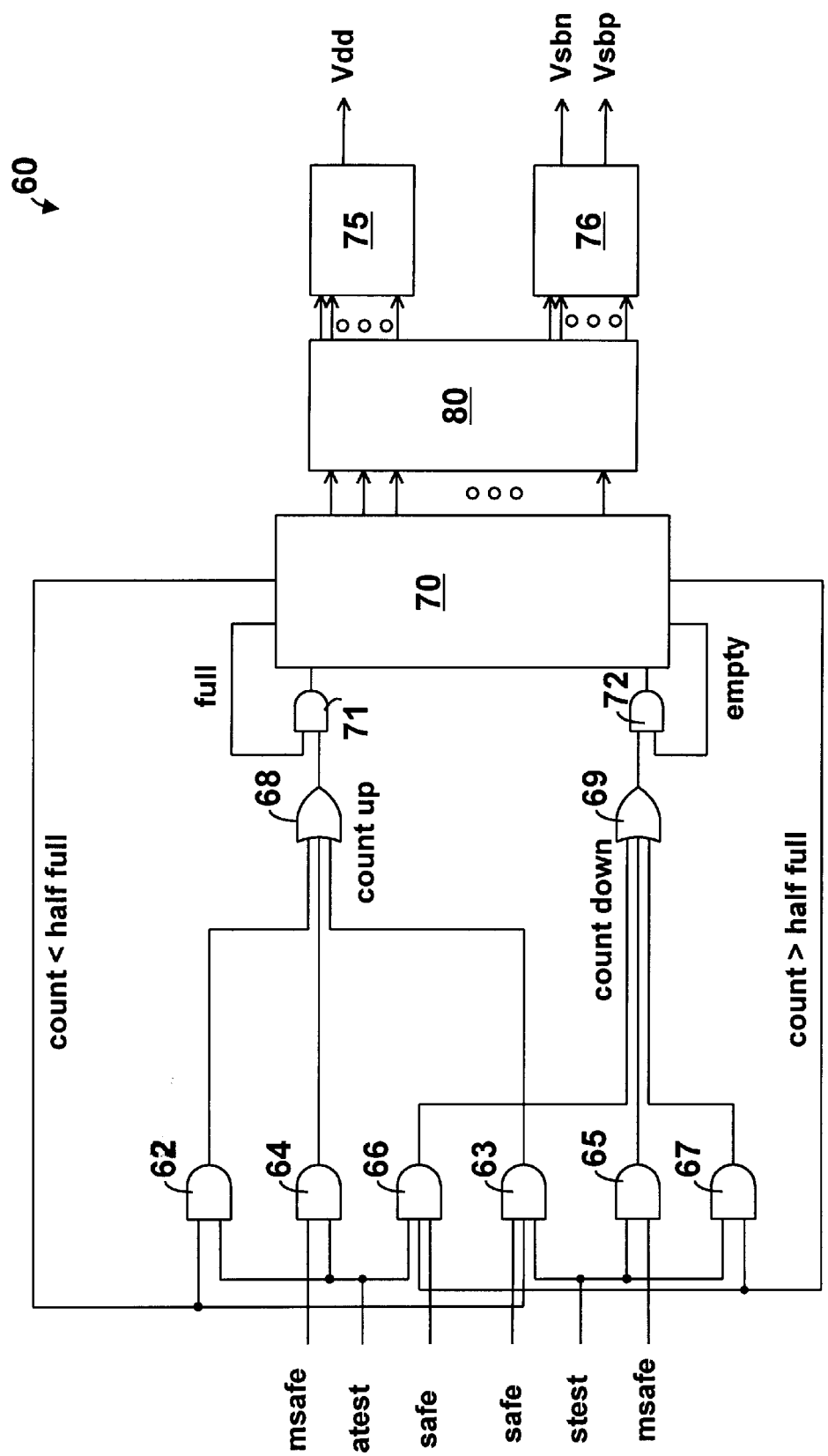
FIG. 6 is a block diagram of a positioning device of the low powering apparatus of FIG. 2.

As seen in FIG. 6, positioning device 60 in accordance with a preferred embodiment of the present invention comprises AND gates 62, 64, 66, 63, 65, 67, 71 and 72, OR gates 68 and 69, up-down counter 70, read-only memory (ROM) device 80, and voltage regulators 75 and 76. One input into AND gates 62, 64 and 66 is the atest signal from state detector 20 (FIG. 2). The second input to AND gate 62 (and the third input into AND gate 63) is a signal from up-down counter 70 indicating when the count is less than half full. The second input to AND gate 64 is the msafe signal from MS device 40 (FIG. 2). The second input to AND gate 66 is the safe signal from MS device 40 (FIG. 2), and the third input to AND gate 66 (and the second input into AND gate 67) is a signal from up-down counter 70 indicating when the count is greater than half full. One input into AND gates 63, 65 and 67 is the stest signal from state detector 20 (FIG. 2). The second input to AND gate 63 is the safe signal from MS device 40 (FIG. 2), and, as aforementioned the third input into AND gate 63 is a signal from up-down counter 70 indicating when the count is less than half full. The second input to AND gate 65 is the msafe signal from MS device 40 (FIG. 2). The second input to AND gate 67 is a signal from up-down counter 70 indicating when the count is greater than half full.

Figure 7:
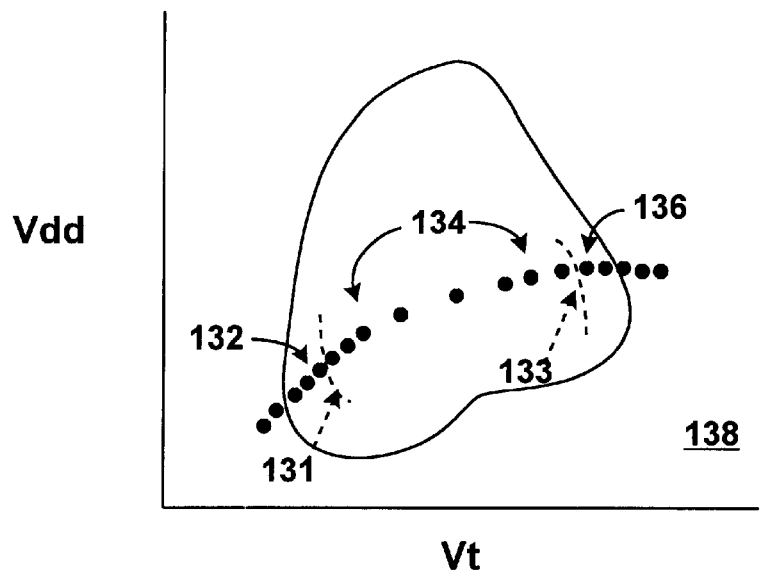
FIG. 7 is a diagram illustrating the safe operating limits of power for the low powering apparatus of FIGS. 3, 5, and 6.

The outputs from AND gates 62, 64, 66, 63, 65 and 67 are ORed through OR gates 68 and 69 and inputted into up-down counter 70. Thus, up-down counter 70 is updated based on the recent history of active and standby modes. AND gates 71 and 72 block the up-down counter at both ends so that the counter will neither overflow nor underflow. The output of up-down counter 70 inputs into ROM device 80 that contains a locus of matching desirable operating points for Vt and Vdd as shown in FIG. 7. Although a counter and ROM are specifically shown in this example, any appropriate state machine, the state of which corresponds to a locus of operating points, and device for storing the operating points may also be used.

Although, in the simplest embodiment, ROM 80 may be programmed by litho mask with values suitable for the technology of manufacture, other processes of programming or accessing the ROM may be used, such as through fuses at a tester with values customized to a particular IC, or simply selecting the best of many sets of suitable values already stored within the ROM by activating selective fuses, etc. ROM device 80 then regulates Vdd and Vsb (both N- and P-type transistors) through voltage regulators 75 and 76. As aforementioned, the regulation and adjustment of Vsb will in turn regulate and adjust Vt.

FIG. 7 illustrates a schmoo 101A with an exemplary locus of matching desirable operating points for Vt and Vdd as programmed by ROM 80 (FIG. 6), wherein Vdd and Vt are adjusted together in a coordinated manner. The locus of operating points fall within safe margins for low power active states 132, safe margins for low power standby states 136, more-than safe margins for either active or standby states 134 and fault 138. In operation, if during each test cycle, the invention determines the IC is presently exhibiting more-than-safe margins 134 and determines either an active or a standby state has predominated in the recent past, up-down counter will assert a more aggressive operating point toward further reducing power consumption. If the margins are merely safe and the current sampled modes agree with the recent past modes, the up-down counter will move toward a more-than-safe margin. Thus, under static conditions the up-down counter will seek the border (e.g. border 131) between safe and more-than safe margins. If the output of state detector 20 (FIG. 2) indicates a break with recent past activity, positioning device 60 (FIG. 6), will start moving the operating point in the opposite direction through the series of locus points until it reaches the other border (e.g., border 133) between safe and more-than-safe operating conditions. The moving of the operating point from one safe margin to the other safe margin (e.g., from region 132 to region 136) is achieved through the signals from the up-down counter indicating that the count is greater than or less than half full. Furthermore, if there are some variations in the schmoo produced by aging or temperature, the present invention compensates with new and more appropriate settings for Vdd and Vt, causing previous more-than-safe margins to be now safe margins, etc.

Figure 8:
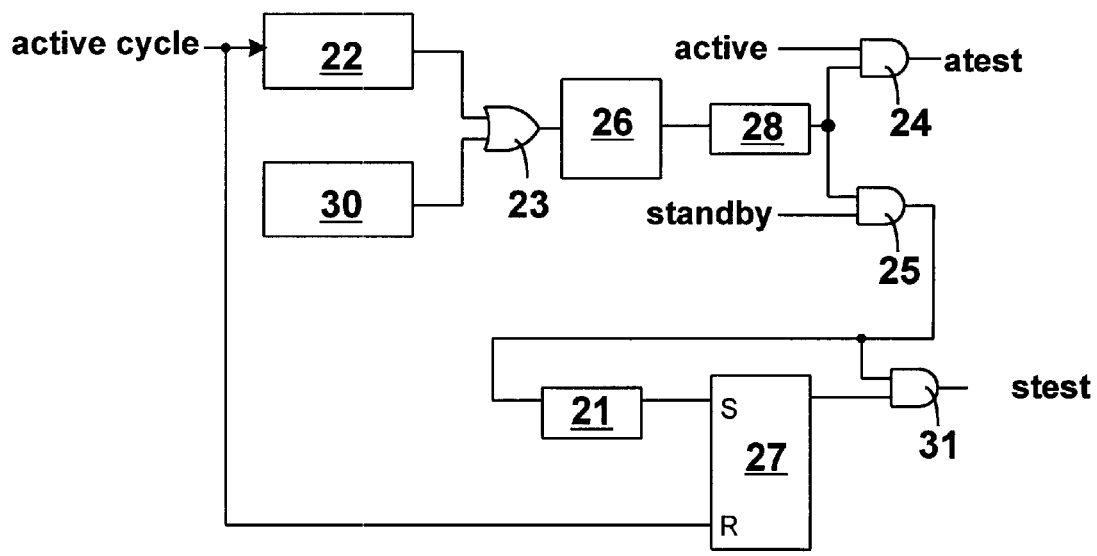
FIG. 8 is a second embodiment of the state detector of the low powering apparatus of FIG. 2.

FIG. 8 illustrates a second embodiment 20A of the state detector 20 of FIG. 3. State detector 20A is similar to state detector 20 (FIG. 3) except state detector 20A further comprises a delay circuit 21, coupled to the output of AND gate 24, a set/reset latch 27, and AND gate 31. The output of delay circuit 21 inputs into the set input of set/reset latch 27 and the active cycle signal inputs into the reset input of set/reset latch 27. The output of set/reset latch 27 inputs into AND gate 31. The second input of AND gate 31 is the output of AND gate 24. AND gate 31 then outputs the standby test limit (stest) signal. Accordingly, state detector 20A will not respond to a single cycle of standby in a field of active cycles. Instead, state detector 20A waits for the standby condition to be confirmed by two, three or more successive standby cycles as seen when the system periodically tests for active or standby cycles.

Figure 9:
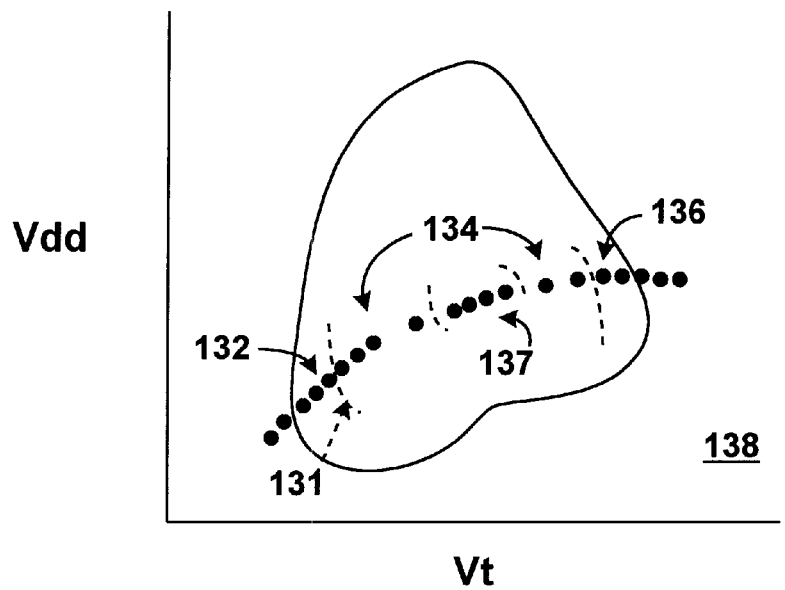
FIG. 9 is a diagram representing the operations of the low powering apparatus of FIG. 2 in accordance with a third embodiment of the present invention.

FIG. 9 illustrates a schmoo diagram 101B in accordance with a third embodiment of the present invention. By modifying up-down counter 70 (FIG. 5) for variable step counting, and programming ROM 80 to include a third cluster of points near the center of the operating schmoo, a third stable operating region 137 is created. This stable operating region comprises sets of Vdd and Vt for regimes of balanced standby and active states.

Figure 10:
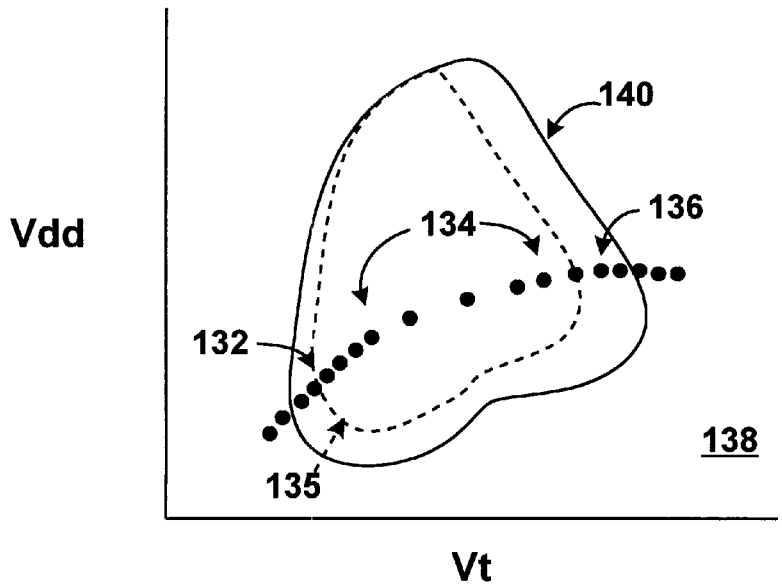
FIG. 10 is a diagram representing the operations of the low powering apparatus of FIG. 2 in accordance with a fourth embodiment of the present invention.

FIG. 10 illustrates a schmoo diagram 101C in accordance with a fourth embodiment of the present invention. The IC has been characterized by a schmoo for both the normal clock frequency 135 and a much lower frequency 140. The lower clock frequency exhibits a significantly wider schmoo 140 indicating that if the equipment is forced into a lower performance state, larger power savings, with lower battery drain, is possible. The present invention is capable of finding the newly established border between safe and more-than-safe regions as allowed by the lower clock frequency.

Figure 11:
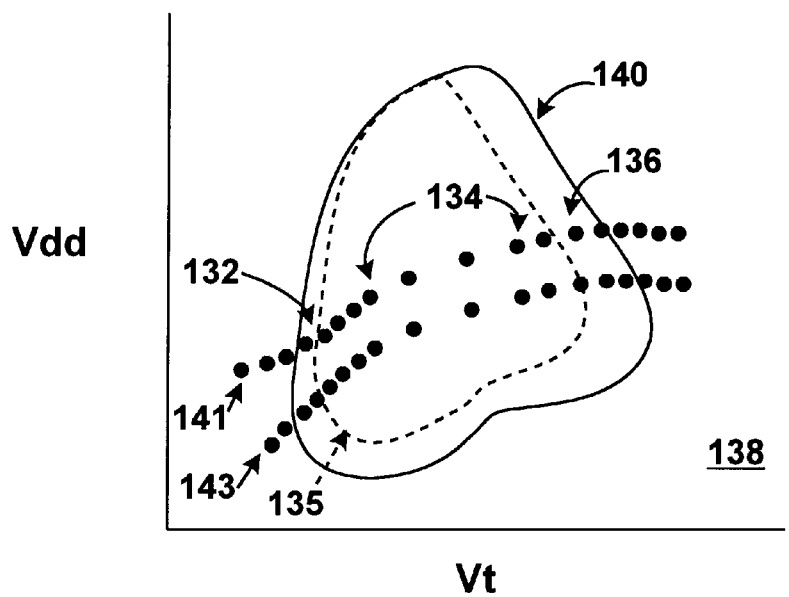
FIG. 11 is a diagram representing the operations of the low powering apparatus of FIG. 2 in accordance with a fifth embodiment of the present invention.

FIG. 11 illustrates a schmoo diagram 101D in accordance with a fifth embodiment of the present invention. Where the IC is designed to operate at two or more distinct frequencies, a tester could be programmed to choose two (or more) loci. Each of the loci would represent the best match to the actual IC product at the characterized frequency. When operating at one of the designated frequencies, the invention would implement the locus prescribed for that frequency for making transitions between the two optimized low power states. In this example, two designated frequencies include the best low frequency match 143 for the low frequency schmoo 140 and the best high frequency match 141 for the high frequency schmoo 135.

Figure 12:
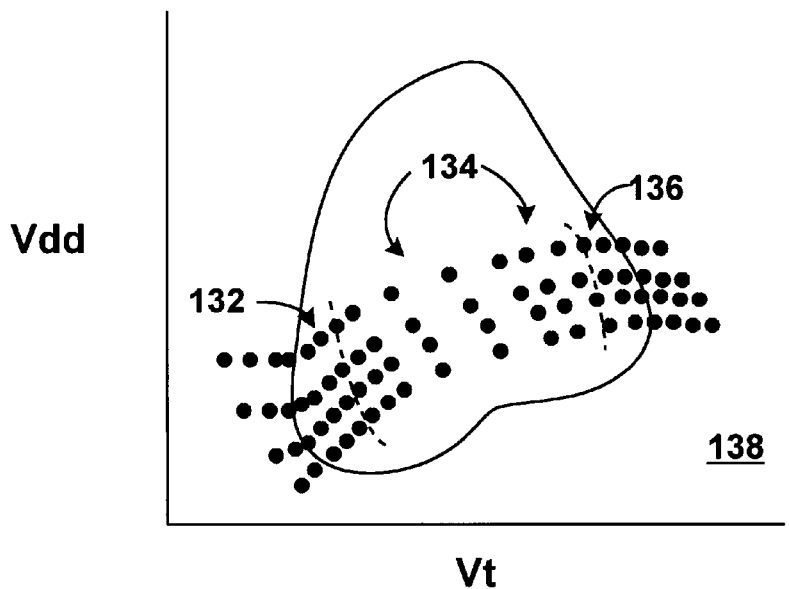
FIG. 12 is a diagram representing the operations of the low powering apparatus of FIG. 2 in accordance with a sixth embodiment of the present invention.

FIG. 12 illustrates a schmoo diagram 101E in accordance with a sixth embodiment of the present invention. Instead of one or two loci of points, a multiple loci of points may be used and selected according to the actual product and desired power level. The selection of loci may be made by activating fuses, or even by storing an alternate sets of points in ROM 80. With the expansion or contraction of a schmoo region (such as in FIG. 10), the multiple loci of points would allow for greater system performance.

It is to be understood that in some applications, it may be necessary to electrically isolate some portions of the apparatus from the supply and body voltage adjustments inherent in this invention. This electrical isolation can be supplied by well-known silicon-on-insulator (SOI) techniques or through complementary metal oxide semiconductor (CMOS) devices in bulk technologies formed within multiple wells. An example of such an implementation is described in pending U.S. patent application Ser. No. 08/866,674, filed on May 30, 1997, entitled "Method of Forming Self-Aligned Halo-Isolated Wells," and assigned to International Business Machines Corporation, and hereby incorporated by reference. The aforementioned disclosure describes a method for forming self-aligned double well structures, which could be used to implement this invention in bulk CMOS.

Thus, the low powering apparatus according to the present invention probes the lowest practical powering level which will sustain desired performance under current operating conditions, without exceeding the margins in which proper operation of the equipment can be safely guaranteed. Also, automatic reduction of the power is achieved.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A low powering apparatus comprising:
   a state detector for detecting a first or second state that has predominated in a recent past;
   a margins of safety device for indicating safe low power margins; and
   a positioning device for adjusting a power level according to the outputs of the state detector and margins of safety device.

2. The apparatus of claim 1, wherein one of said first or second state is active.

3. The apparatus of claim 1, wherein one of said first or second state is standby.

4. The apparatus of claim 1, wherein said state detector further comprises:
   an active cycle counter;
   a low frequency oscillator; and
   an interrupt device coupled to the active cycle counter and the low frequency oscillator.

5. The apparatus of claim 4, wherein said low frequency oscillator comprises:
   a plurality of sub-oscillators having oscillator time constants set to prime numbers; and
   a decoder, responsive to said plurality of sub-oscillators, for outputting a low frequency output with random variations.

6. The apparatus of claim 1, wherein said margins of safety device comprises:
   a worst case path simulated device for indicating a safe margin; and
   a safety margin device, connected to said worst case path simulated device for indicating a more-than-safe margin.

7. The apparatus of claim 3, wherein said positioning device comprises:
   a state machine, wherein a state of said state machine corresponds to a locus of operating points; and
   a storing device, coupled to the state machine, for storing the locus of operating points.

8. The apparatus of claim 7, wherein said state machine and said storing device comprise:
   a counter; and
   a ROM, coupled to said counter, for storing the locus of operating points and adjusting the power level through adjusting coordinated threshold voltage and power supply voltage.

9. The apparatus of claim 8, wherein said adjusted coordinated threshold voltage and power supply voltage correspond to a power level between said safe margin and said more-than-safe margin.

10. The apparatus of claim 1, wherein indicating safe low power margins includes indicating a safe margin and indicating a more-than-safe margin.

11. A low powering apparatus comprising:
    means for minimizing a power level for full performance at a first state;
    means for minimizing a power level for full performance at a second state; and
    means for establishing margins of safety for the first and second state.

12. The apparatus of claim 11, wherein specific portions of said apparatus are formed in unique regions on a silicon-on-insulator (SOI) device.

13. The apparatus of claim 11, wherein specific portions of said apparatus are formed in unique wells within a complimentary metal oxide silicon (CMOS) bulk device.

14. The apparatus of claim 11, wherein said first state is active and said second state is standby.

15. The apparatus of claim 11, wherein said means for establishing the margins of safety further comprises:
    means for simulating a worst case path to indicate a safe margin; and
    means for adding safety margins to the worst case path to indicate a more-than-safe margin.

16. The apparatus of claim 11, wherein said means for minimizing the power level for full performance at said first and second state further comprise:
    means for detecting if said first or second state has predominated in a recent past; and
    means for positioning said power level at a boundary corresponding to said safe margin, said more-than-safe margin, and said predominated first or second state.

17. The apparatus of claim 16, wherein said means for positioning further comprises:
    means for storing a locus of operating points; and
    means of matching said stored locus to said power level.

18. The apparatus of claim 16, wherein said means for detecting further comprises:
    an active cycle counter;
    a low frequency oscillator; and
    means for interrupting said positioning means corresponding to outputs of the active cycle counter and the low frequency oscillator.

19. The apparatus of claim 18, wherein said low frequency oscillator comprises:
    a plurality of sub-oscillators having oscillator time constants set to prime numbers; and
    a decoder, responsive to said plurality of sub-oscillators, for outputting a low frequency output with random variations.

20. A method for minimizing power while maintaining full performance for a first and second state comprising the steps of:
    a) detecting if said first or second state that has predominated in a recent past;

b) indicating safe low power margins; and c) adjusting a power level according to the detected first or second state and the safe low power margins.

21. The method of claim 20, wherein step b) further comprises the steps of:

simulating a worst case path to indicate a safe margin; and simulating a worst case path with a safety margin device to indicate a more-than-safe margin.

22. The method of claim 20, wherein step c) further comprises the steps of:

storing a locus of operating points corresponding to coordinated threshold voltage and power supply voltage; and adjusting said coordinated threshold voltage and power supply voltage to adjust said power level.

23. The method of claim 20, wherein the indicating step includes indicating a safe margin and indicating a more-than-safe margin.

24. A portable electrical system having a low powering apparatus comprising:

means for minimizing a power level of said system at a first state without compromising full performance of said system;

means for minimizing a power level of said system at a second state without compromising full performance of said system; and means for adjusting coordinated threshold voltage and power supply voltage while switching between said first and said second state.

25. The system of claim 24, wherein said first state is active, and said second state is standby.

26. The system of claim 24, wherein said means for adjusting further comprises:

means for storing a locus of operating points; and means of matching said stored locus to said power level.

27. The system of claim 24, wherein said means for minimizing the power level at said first and second state further comprise:

means for detecting if said first or second state has predominated in a recent past; and means for establishing margins of safety for the first and second state.

28. The system of claim 27, wherein said means for establishing the margins of safety further comprises:

means for simulating a worst case path to indicate a safe margin; and means for adding safety margins to the worst case path to indicate a more-than-safe margin.

* * * * *